(12) United States Patent
Gupta et al.

(10) Patent No.: US 12,175,723 B2
(45) Date of Patent: Dec. 24, 2024

(54) UNSUPERVISED LEARNING OF OBJECT KEYPOINT LOCATIONS IN IMAGES THROUGH TEMPORAL TRANSPORT OR SPATIO-TEMPORAL TRANSPORT

(71) Applicant: DeepMind Technologies Limited, London (GB)

(72) Inventors: Ankush Gupta, London (GB); Tejas Dattatraya Kulkarni, London (GB)

(73) Assignee: DeepMind Technologies Limited, London (GB)

( * ) Notice: Subject to any disclaimer, the term of this patent is extended or adjusted under 35 U.S.C. 154(b) by 385 days.

(21) Appl. No.: 17/608,620

(22) PCT Filed: May 5, 2020

(86) PCT No.: PCT/EP2020/062421
§ 371 (c)(1),
(2) Date: Nov. 3, 2021

(87) PCT Pub. No.: WO2020/225247
PCT Pub. Date: Nov. 12, 2020

(65) Prior Publication Data
US 2022/0215580 A1 Jul. 7, 2022

Related U.S. Application Data

(60) Provisional application No. 62/844,029, filed on May 6, 2019.

(51) Int. Cl.
*G06V 10/00* (2022.01)
*G06T 7/73* (2017.01)
(Continued)

(52) U.S. Cl.
CPC .............. *G06V 10/462* (2022.01); *G06T 7/74* (2017.01); *G06V 10/82* (2022.01); *G06T 2207/20081* (2013.01); *G06T 2207/20084* (2013.01)

(58) Field of Classification Search
CPC ........ G06V 10/462; G06V 10/82; G06T 7/74; G06T 2207/20081; G06T 2207/20084; G06F 18/214; G06F 18/24133
See application file for complete search history.

(56) References Cited

U.S. PATENT DOCUMENTS

2019/0122329 A1* 4/2019 Wang .................... G06T 3/0093

OTHER PUBLICATIONS

Zhang et al, Unsupervised discovery of object landmarks as structural representations. In Proceedings of the conference on Computer Vision and Pattern Recognition (CVPR) (Year: 2018).*

(Continued)

*Primary Examiner* — Ping Y Hsieh
*Assistant Examiner* — Xiao Liu
(74) *Attorney, Agent, or Firm* — Fish & Richardson P.C.

(57) ABSTRACT

Methods, systems, and apparatus, including computer programs encoded on computer storage media, for unsupervised learning of object keypoint locations in images. In particular, a keypoint extraction machine learning model having a plurality of keypoint model parameters is trained to receive an input image and to process the input image in accordance with the keypoint model parameters to generate a plurality of keypoint locations in the input image. The machine learning model is trained using either temporal transport or spatio-temporal transport.

24 Claims, 4 Drawing Sheets

(51) Int. Cl.
*G06V 10/46* (2022.01)
*G06V 10/82* (2022.01)

(56) References Cited

OTHER PUBLICATIONS

International Preliminary Report on Patentability in International Appln. No. PCT/EP2020/062421, dated Nov. 2, 2021, 11 pages.
International Search Report and Written Opinion in International Appln. No. PCT/EP2020/062421, dated Jul. 28, 2020, 13 pages.
Jakab et al., "Unsupervised Learning of Object Landmarks through Conditional Image Generation," Advances in Neural Information Processing Systems 31, 2018, 12 pages.
Jakab et al., "Vedaldi. Unsupervised learning of object landmarks through conditional image generation," Advances in Neural Information Processing Systems 31, 2018, p. 12.
Johnson et al., "Perceptual losses for real-time style transfer and super-resolution," European conference on computer vision, 2016, pp. 694-711.
Kanazawa et al., "End-to-end Recovery of Human Shape and Pose," Proceedings of the IEEE Conference on Computer Vision and Pattern Recognition, 2018, pp. 7122-7131.
Kingma et al., "Adam: A method for stochastic optimization," CoRR, Dec. 2014, arXiv: 1412.6980, 15 pages.
Ma et al., "Disentangled Person Image Generation," Proceedings of the IEEE Conference on Computer Vision and Pattern Recognition, 2018, pp. 99-108.
Thompson et al., "Joint Training of a Convolutional Network and a Graphical Model for Human Pose Estimation," Advances in Neural Information Processing Systems 27, 2014, 9 pages.
Xu et al., "Unsupervised Discovery of Parts, Structure, and Dynamics," CoRR, Mar. 2019, arxiv.org/abs/1903.05136, 15 pages.
Zhang et al., "Unsupervised discovery of object landmarks as structural representations," Proceedings of the IEEE Conference on Computer Vision and Pattern Recognition, 2018, pp. 2694-2708.

* cited by examiner

UNSUPERVISED LEARNING OF OBJECT KEYPOINT LOCATIONS IN IMAGES THROUGH TEMPORAL TRANSPORT OR SPATIO-TEMPORAL TRANSPORT

CROSS-REFERENCE TO RELATED APPLICATION

This application is a National Stage Application under 35 U.S.C. § 371 and claims the benefit of International Application No. PCT/EP2020/062421, filed on May 5, 2020, which claims priority to U.S. Provisional Application Ser. No. 62/844,029, filed on May 6, 2019. The disclosure of the prior application is considered part of and is incorporated by reference in the disclosure of this application.

BACKGROUND

This specification relates to training a machine learning model to identify object keypoint locations in video frames.

Machine learning models receive an input and generate an output, e.g., a predicted output, based on the received input and on values of the parameters of the model.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a system implemented as one or more computer programs on one or more computers in one or more physical locations that trains a keypoint extraction machine learning model having a plurality of keypoint model parameters, i.e., to determine trained values of the keypoint model parameters and corresponding methods performed by the system.

The keypoint extraction machine learning model is a machine learning model that is configured to receive an input image of an environment and to process the input image in accordance with the keypoint model parameters to generate a plurality of keypoint locations in the input image.

Because of the way that the system trains the model, the keypoint locations generated by the trained model will point to, i.e., correspond to the locations of, points of interest in the environment that is depicted in the input image. In particular, the keypoint locations point to points of interest on objects in the environment. For example, the keypoint locations can point to joints of objects in the environment or point to points on graspable surfaces of objects that are depicted in the input image.

Particular embodiments of the subject matter described in this specification can be implemented so as to realize one or more of the following advantages.

This specification describes a system and method that trains a keypoint extraction machine learning model. Thus a result of using the described system and method is a trained keypoint extraction machine learning model. By training the model as described in this specification, keypoint locations generated by the trained model accurately reflect the portions of objects of the environment that are important to interacting with the objects, e.g., joints of objects in the environment. In particular, the keypoint locations generated by the trained model are of sufficiently high quality that they can be used to improve the performance for a control system of an agent, e.g., a robot or an autonomous vehicle, interacting with the environment. For example, by using the keypoint locations as part of a state representation of a reinforcement learning system that controls the agent, i.e., instead of or in addition to images of the environment, the system can more effectively control the agent and more effectively select actions that cause the agent to explore the environment during learning.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
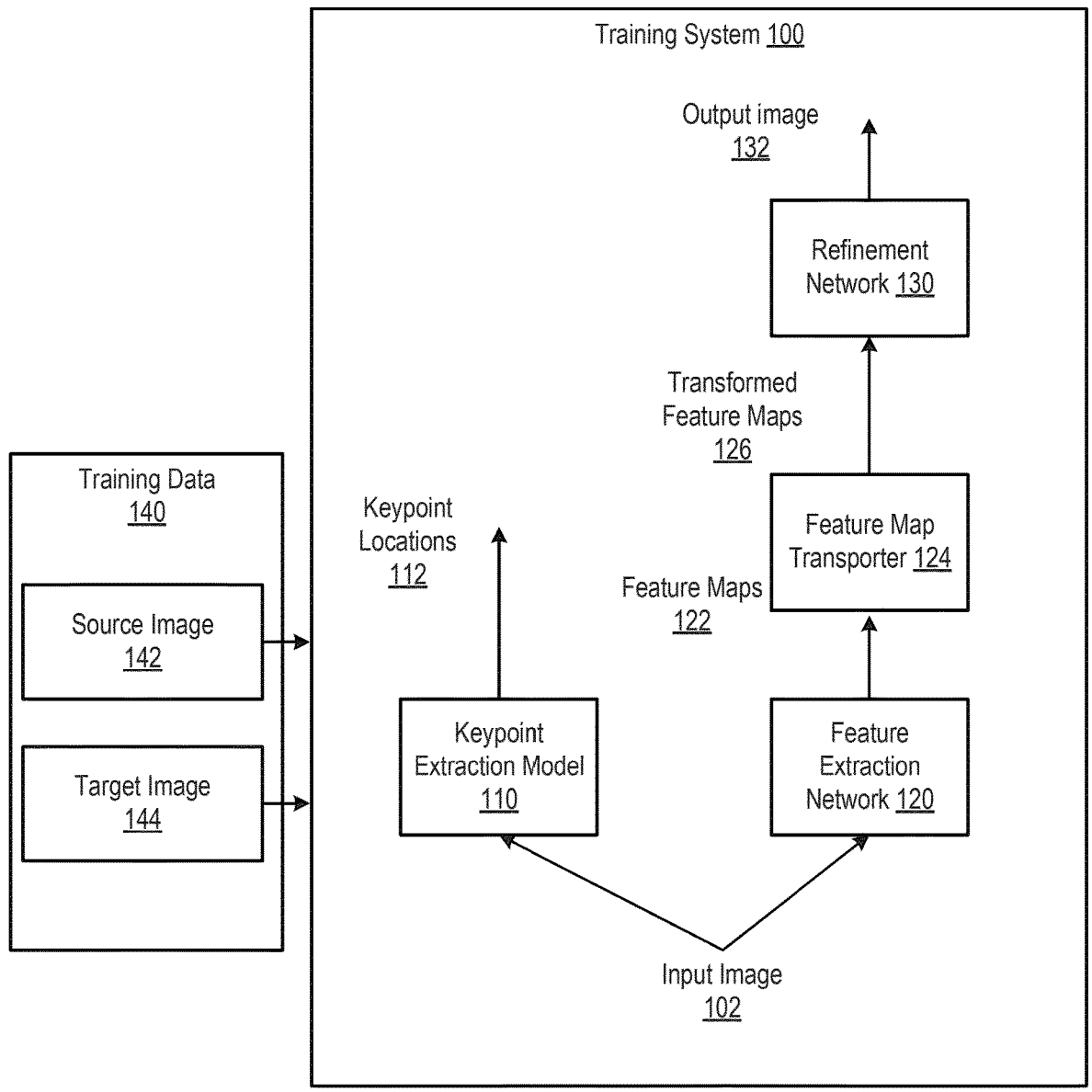
FIG. 1 shows an example machine learning model training system.

FIG. 1 shows an example machine learning model training system 100. The machine learning model training system 100 is an example of a system implemented as computer programs on one or more computers in one or more locations, in which the systems, components, and techniques described below can be implemented.

The system 100 trains a keypoint extraction machine learning model 110 having a plurality of parameters (referred to in this specification as "keypoint model parameters"), i.e., to determine trained values of the keypoint model parameters.

The keypoint extraction machine learning model 110 is a machine learning model that is configured to receive an input image 102 of an environment and to process the input image in accordance with the keypoint model parameters to generate a plurality of keypoint locations 112 in the input image 102. Each keypoint location 112 identifies a respective spatial region in the input image 102.

Because of the way that the system 100 trains the keypoint extraction machine learning model 110, the keypoint locations 112 generated by the trained model 110 will point to, i.e., correspond to the locations of, points of interest in the environment that is depicted in the input image 102. In particular, the keypoint locations point to points of interest on objects in the environment. For example, the keypoint locations can point to joints of objects in the environment or point to points on graspable surfaces of objects that are depicted in the input image.

Any of a variety of machine learning models that generate outputs that are locations in received input images can be used as the keypoint extraction machine learning model 110.

For example, the keypoint extraction machine learning model 110 may be a keypoint extraction neural network. As a particular example, the keypoint extraction machine learning model 110 can be the model described in T. Jakab, A. Gupta, H. Bilen, and A. Vedaldi. Unsupervised learning of object landmarks through conditional image generation. In Advances in Neural Information Processing Systems, 2018. As another example, the keypoint extraction machine learning model 110 can be the model that is described in Angjoo Kanazawa, Michael J. Black, David W. Jacobs, Jitendra Malik. End-to-end Recovery of Human Shape and Pose, CVPR 2018. As another example, the keypoint extraction machine learning model 110 can the be the model that is described in Thompson, et al, Joint Training of a Convolutional Network and a Graphical Model for Human Pose Estimation, available at arXiv:1406.2984.

Once the system 100 has trained the keypoint extraction machine learning model 110, the trained model 110 can be used by a control system for an agent interacting with the environment, e.g., a robot, an autonomous vehicle or other mechanical agent interacting with a real world environment to perform a particular task, to control the agent. In particular, the control system may select actions to be performed by the agent in response to received state data that includes images of the environment. The control system can use the keypoint extraction machine learning model to process each received image using the trained model 110 and then use the keypoint locations generated by the trained model 110 to improve the performance of controlling the agent.

For example, the control system can use the keypoint locations as part of an input state representation that is processed by a control policy to select an action to be performed by the agent. Another part of the input state representation may be from the feature extraction neural network described later, the image from which the keypoint locations were extracted, or both. For example, the control system can provide the input state representation to a policy neural network, e.g., one that has been trained or is being trained through reinforcement learning, that generates action outputs for controlling the agent. Making use of these keypoint locations in controlling the agent can improve the control system's ability to control the robot to perform a specified task that involves interacting with objects in the environment or to control the robot to effectively explore the environment.

As another example, the control system can use the keypoint locations to define an intrinsic reward signal for use in learning a control policy through reinforcement learning, either in combination with an extrinsic, environment-provided reward or as the only reward signal. Generally, the intrinsic reward can be based on how much each keypoint moves between different images of the environment. As a particular example, the overall intrinsic reward can include N intrinsic rewards for each of the keypoint locations, with each of the N intrinsic reward corresponding to one of N directions, e.g., the four cardinal directions, and measuring how much the keypoint location moved in the corresponding direction between two images of the environment. Using this intrinsic reward signal can cause the agent to effectively explore the environment, even in the absence of an extrinsic reward. Effectively exploring the environment can in turn lead to improved task performance for tasks in which effectively exploring the environment is important, e.g., navigation tasks or tasks that require locating objects in the environment.

The system 100 trains the keypoint extraction machine learning model 110 on training data 140.

The training data 140 includes source images 142 of an environment and, for each source image 142, a corresponding target image 144 of the environment. Generally, each source image 142 and target image 144 has the same resolution as the input image 102, i.e., as the images that are going to be processed by the keypoint extraction machine learning model 110 after training.

For each source image 142, the target image 144 is an image of the environment that was captured at a different time than the source image 142. For example, the target image 142 may have been captured during the same trajectory of interaction of an agent with an environment as the source image 144, i.e., such that the images are likely to differ only in objects' pose/geometry or appearance. A trajectory of interaction may refer to a sequence of consecutive actions performed by agent while interacting with the environment. In implementations the source image 142 and the target image 144 are frames from a video image sequence of the environment.

As a particular example, to determine which target image 144 corresponds to a given source image 142, the system 100 can randomly sample a time delta from a set of possible time deltas, e.g., from a set of possible time deltas that are each associated with a different image from the same trajectory as the source image 142, and select, as the target image 144 corresponding to the given source image 142, the image that was captured at the sampled time delta from the time at which the source image 142 was captured.

To train the keypoint extraction machine learning model 110 on the training data 140, the system 100 makes use of a feature extraction neural network 120 and a refinement (i.e., image reconstruction) neural network 130.

The feature extraction neural network 120 is a neural network having parameters (referred to in this specification as "feature extraction network parameters") and that is configured to process the input image 102 to generate a feature map 122 that includes respective feature vectors for each of a plurality of locations in the input image 102.

In particular, the feature extraction neural network 120 is a convolutional neural network that maps an image having the resolution of the source and target images to a feature map that includes respective vectors for each of the plurality of locations. The feature map output by the feature extraction neural network 120 generally has a lower resolution than the input image 102. Thus, each location in the feature map corresponds to different region of multiple pixels in the input image 102.

More specifically, the keypoint locations generated by the keypoint extraction machine learning model 110 each identify a respective one of the locations in the feature map 122, i.e., the locations in the input image 102 pointed to by the keypoint locations are the same size as the locations in the feature map 122.

The refinement neural network 130 is a neural network having parameters ("refinement network parameters") and that is configured to receive a transformed feature map 126 generated from the feature map 122 by a feature map transporter engine 124 and to generate an output image 132.

Generally, a transformed feature map 126 has the same dimensionality as the feature map 122 but is a modified version of the feature map 122 that has been generated by the feature map transporter engine using either spatio-temporal transport or temporal transport. Generating a transformed feature map 126 will be described in more detail below with reference to FIGS. 2-4.

In particular, the refinement neural network 130 is a (transposed) convolutional neural network that maps the input feature map to an output image 132 having the same resolution as the input image.

As will be discussed in more detail below, the system performs the training such that output images 132 generated by the refinement neural network 130 by processing transformed feature maps generated from source images 142 will be accurate reconstructions of the corresponding target images 144 from the training data 140.

Making use of these neural networks while training the keypoint extraction machine learning model 110 on the training data 140 will be described in more detail below with reference to FIGS. 2-4.

Figure 2:
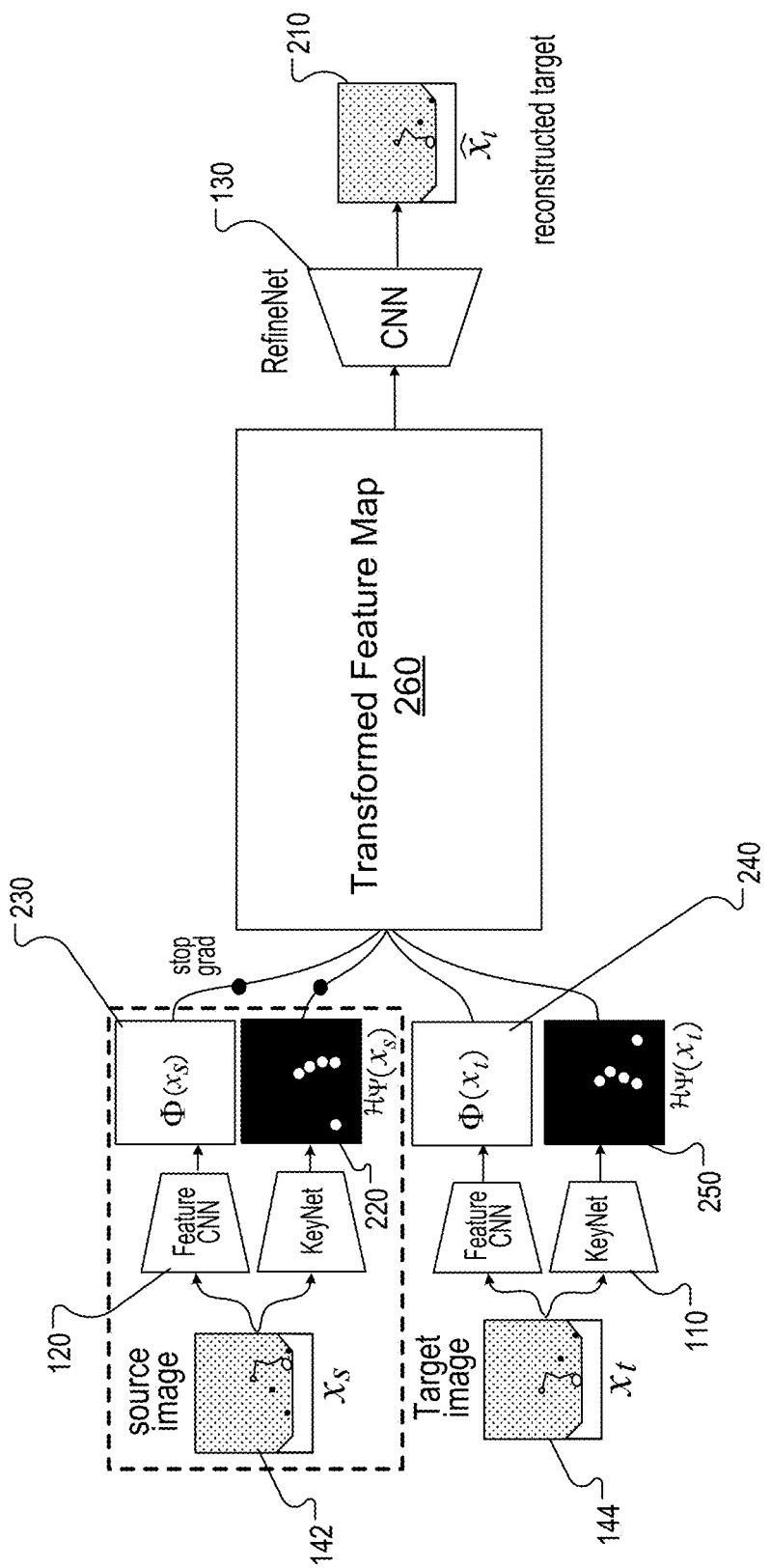
FIG. 2 is a diagram of an example of the processing performed during the training of keypoint extraction machine learning model.

FIG. 2 is a diagram of an example of the processing performed during the training of keypoint extraction machine learning model.

In particular, as part of the training of the keypoint extraction machine learning model, the system obtains a source image 142 of an environment and a target image of the environment 144 that was captured at a different time than the source image, i.e., the target image 144 that corresponds to the source image 142 in the training data 140.

The system then generates a reconstruction 210 of the target image 144 using information from the source image 142 and information that is "transported" into the source image 142 based on information from the target image 144.

As part of generating the reconstruction 210, the system processes the source image 142 using the feature extraction neural network 120 in accordance with current values of the feature extraction network parameters to generate a source feature map 220 that includes respective source feature vectors for each of a plurality of locations in the source image 142.

The system then processes the source image 142 using the keypoint extraction machine learning model 110 in accordance with current values of the keypoint model parameters to generate a plurality of source keypoint locations 230.

Each source keypoint location 230 is a respective one of the plurality of locations, i.e., the keypoint locations 230 are at the same resolution as the feature map 220 generated by the feature extraction neural network 120.

The system also processes the target image 144 using the keypoint extraction machine learning model 110 in accordance with current values of the keypoint model parameters to generate a plurality of target keypoint locations 250.

In some implementations, the system also processes the target image 144 using the feature extraction neural network 120 in accordance with the current values of the feature extraction network parameters to generate a target feature map 240 that includes respective target feature vectors for each of the plurality of locations.

Like the source keypoint locations 230, each target keypoint location 250 is a respective one of the plurality of locations in the target feature map 240.

The system generates, from the source feature map, a transported feature map 260 by augmenting the source feature map using the source keypoint locations, the target keypoint locations and, in some implementations, data from the target feature vectors for the target keypoint locations.

Generally, this specification describes two different techniques for generating the transported feature map 260: temporal transport and spatio-temporal transport.

At a high level, in both techniques, the system suppresses, i.e., lowers the weight assigned to, feature vectors in the source feature map 220 that are for (i) source keypoint locations 230 or (ii) target keypoint locations 250 to generate a suppressed source feature map.

More specifically, the system generates the suppressed source feature map by generating a source heatmap representation of the plurality of locations, i.e., of an image having the same resolution as the feature maps generated by the feature extraction neural network 120. The source heatmap representation has Gaussian peaks at each of the source keypoint locations. In other words, the source heatmap representation is an image that has the same dimensions as the feature maps 220 and 260 and that contains fixed-variance isotropic Gaussians around each of the source keypoint locations.

The system also generates a target heatmap representation 280 of the plurality of locations having Gaussian peaks at each of the target keypoint locations. In other words, the target heatmap representation is an image that has the same dimensions as the feature maps 220 and 260 and that contains fixed-variance isotropic Gaussians around each of the target keypoint locations (instead of the source keypoint locations).

The system then generates the source suppressed feature map using the source and target heatmap representations. In particular, the source suppressed feature map satisfies, that is, may be determined from, the following:

$$(1-\mathcal{H}_{\Psi(x_t)}) \cdot (1-\mathcal{H}_{\Psi(x_{t'})}) \cdot \Phi(x_t),$$

where $\Phi(x_t)$ is the source feature map, $\mathcal{H}_{\Psi(x_t)}$ is the source heatmap representation, and $\mathcal{H}_{\Psi(x_{t'})}$ is the target heatmap representation. By applying these two heatmap representations to the source feature map, the system effectively moves toward zero values of feature vectors at locations that correspond to source keypoint locations ($\Psi(x_t)$) and target keypoint locations ($\Psi(x_{t'})$).

In temporal transport, the system then augments this suppressed source feature map with data from the target feature vectors for the target keypoint locations 250 in the target feature map 230 to generate the transported feature map 260.

More specifically, the system may also generate a target suppressed feature map that suppresses target feature vectors that are at locations other than the target keypoint locations 250. In some implementations, to generate the target suppressed feature map, the system multiplies the target heatmap representation ($\mathcal{H}_{\Psi(x_{t'})}$) by the target feature map $\Phi(x_{t'})$, 240, resulting in a target suppressed feature map at which values of feature vectors that do not correspond to any of the target keypoint locations are moved toward zero.

The system then combines, i.e., adds, the source suppressed feature map and the target suppressed feature map to generate the transported feature map 260.

This scheme is referred to as temporal transport because the features from the target feature map that are at the target keypoint locations are "transported" into the source feature map when generating the transported feature map 260.

In spatio-temporal transport, the system instead augments the suppressed source feature map with data from other source feature vectors that have moved between the source and target images to generate the transported feature map 260. Thus, in implementations when spatio-temporal transport is used, the system does not need to generate the target feature map 240 because the target feature vectors are not used to generate the transported feature map 260.

More specifically, in spatio-temporal transport, the system may generate a source shifted feature map that shifts (uses) data from, i.e., data characterizing, source feature vectors that are at source keypoint locations to source feature vectors that are at target keypoint locations. In particular, the source shifted feature map satisfies:

$$\Sigma_{i=1}^{K} \mathcal{H}_{\Psi(x_{t'})}^{i} \odot (\Sigma_{h,w} \mathcal{H}_{\Psi(x_t)}^{i} \cdot \Phi(x_t)),$$

where K is the total number of keypoint locations and ⊙ represents the Hadamard (broadcast) product of the spatially reduced source image features at the i-th source keypoint location ($\Sigma_{h,w} \mathcal{H}_{\Psi(x_t)} \cdot \Phi(x_t)$)) with a Gaussian map at the i-th target keypoint location ($\mathcal{H}_{\Psi(x_{t'})}$). In other words, the source shifted feature map is the sum of, for each keypoint location i of the K keypoint locations, a Hadamard product between the spatially reduced source image features at the i-th source image keypoint location and a Gaussian map at the i-th target keypoint location, i.e., a map that includes only a Gaussian peaked at the i-th target keypoint location.

The system then combines, i.e., adds, the source suppressed feature map and the source shifted feature map to generate the transported feature map 260.

This scheme is referred to as spatio-temporal transport because information from the target image is used to spatially "transport" features within the source feature map to generate the transported feature map 260.

In both temporal transport and spatio-temporal transport, the system generates the reconstruction 210 of the target image 144 from the transported feature map 260. In particular, the system processes the transported feature map 260 using the refinement neural network 130 to generate the reconstruction 210, i.e., the reconstruction is the output image generated by the refinement neural network 130 by processing the transported feature map 260.

Thus, in temporal transport, because features in the source feature map at both source keypoint locations and target keypoint locations are suppressed and only features at the target keypoint locations are replaced, the refinement neural network then has two tasks in order to accurately reconstruct the target image: (i) to inpaint the missing features at the source keypoint locations and (ii) to clean up the image around the target positions.

The system then determines an update to the current values of the keypoint model parameters by determining gradients with respect to the keypoint model parameters of an objective function that measures an error between the target image 144 and the reconstruction 210 of the target image 144.

For example, the objective function can be an error between the reconstruction 210 and the target image 144 in a pixel space of the reconstruction 210 and the target image 144. Any appropriate pixel space error function can be used as the objective function but, as a particular example, the objective function can be a pixel-wise squared-$l_2$ reconstruction error.

In some implementations, the other neural networks, i.e., the feature extraction network 120 and the refinement neural network 130, are pre-trained and the values of the parameters of the networks are fixed during the training of the keypoint extraction machine learning model 110.

In some other implementations, however, the system trains the feature extraction neural network 120, the refinement neural network 130, or both jointly with the keypoint extraction machine learning model 110.

For example, when the system is training the feature extraction neural network 120 jointly with the keypoint extraction machine learning model 110, the system also determines an update to the current values of the feature extraction network parameters by determining gradients with respect to the feature extraction network parameters of the objective function that measures the error between the target image 144 and the reconstruction 210 of the target image 144.

As another example, when the system is training the refinement neural network 130 jointly with the keypoint extraction machine learning model 110, the system also determines an update to the current values of the refinement network parameters by determining gradients with respect to the refinement network parameters of the objective function that measures the error between the target image 144 and the reconstruction 210 of the target image 144.

As can be seen from FIG. 2, in temporal transport the system applies a stop gradient ("stop grad") during training to prevent gradients from being backpropagated back through the source feature map and the source keypoint locations. Instead, gradients are only backpropagated through the target feature map and the target keypoint locations in order to compute the gradients with respect to the keypoint extraction model parameters and, when done, the feature extraction network parameters.

In spatio-temporal transport, the system can apply a stop gradient during training to prevent gradients from being backpropagated back through the source keypoint locations (while still allowing gradients to flow back through the source feature map), since target feature maps are not used (or not generated) when employing spatio-temporal transport and gradients need to be backpropagated through the source feature map in order to provide a learning signal for the neural network 220.

Figure 3:
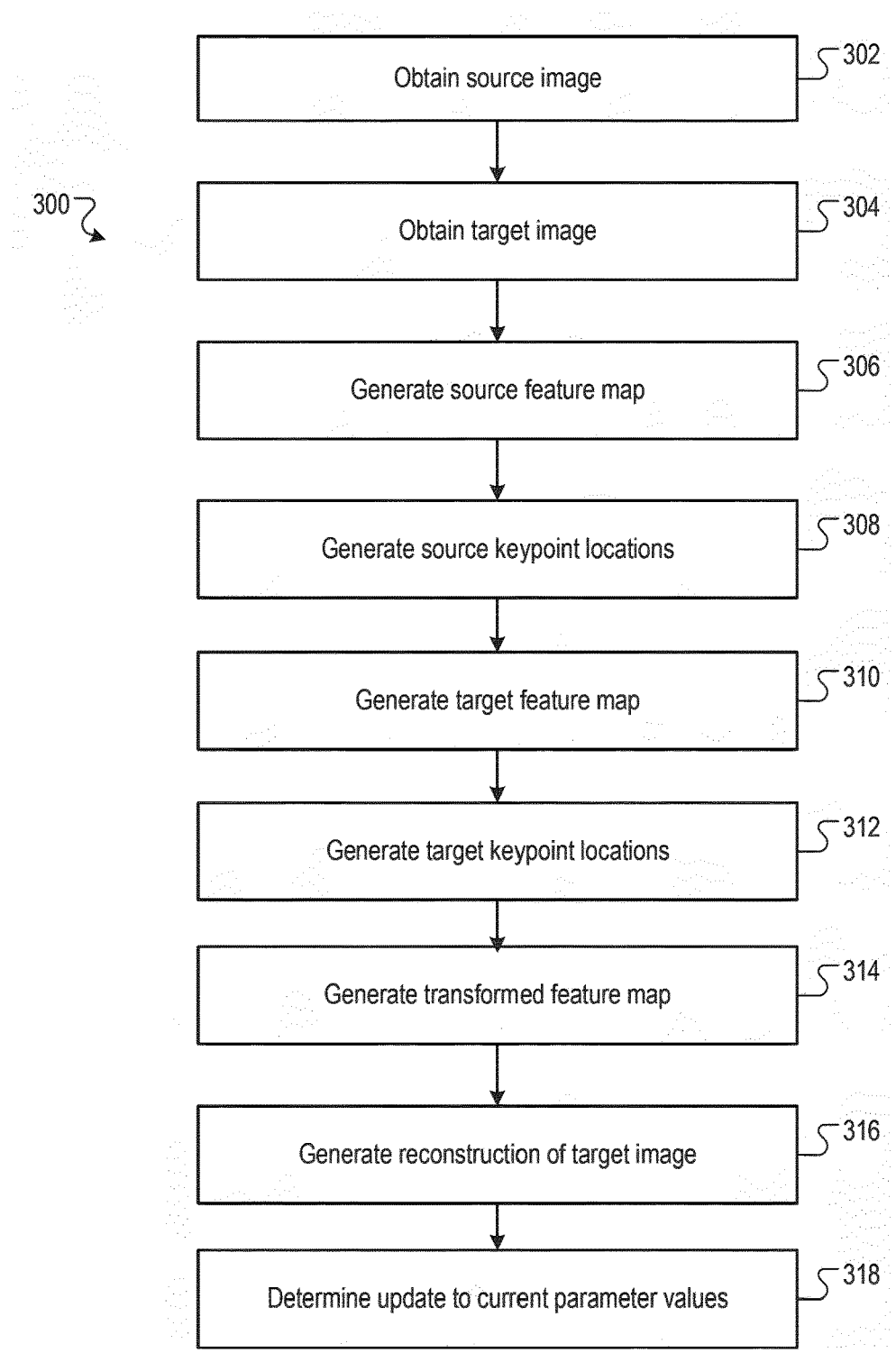
FIG. 3 is a flow diagram of an example process for training the keypoint extraction machine learning model using temporal transport.

FIG. 3 is a flow diagram of an example process 300 for training the keypoint extraction machine learning model using temporal transport. For convenience, the process 300 will be described as being performed by a system of one or more computers located in one or more locations. For example, a machine learning model training system, e.g., the machine learning model training system 100 of FIG. 1, appropriately programmed, can perform the process 300.

The system can perform the process 300 multiple times for multiple different source image-target image combinations to determine trained values of the keypoint extraction model parameters from initial values of the keypoint extraction model parameters, i.e., can perform the process 300 repeatedly at different training iterations of an iterative training process to train the keypoint extraction machine learning model.

For example, the system can perform the process 300 for each source image-target image combination in a mini-batch of training data to determine respective updates to the current values of the keypoint extraction model parameters and then use the updates computed for each of the pairs to update the current values, e.g., by combining, e.g., averaging or summing, the updates and then applying, i.e., adding or subtracting, the combined update to the current values of the keypoint extraction model parameters.

The system can repeatedly update the parameters using different mini-batches to train the model, i.e., repeat the updating for a specified number of iterations, for a specified amount of time, or until the change in the values of the parameters falls below a threshold.

The system obtains a source image of an environment (step 302) and a target image of the environment that was captured at a different time than the source image (step 304).

The system processes the source image using the feature extraction neural network in accordance with current values of the feature extraction network parameters to generate a source feature map that includes respective source feature vectors for each of a plurality of locations (step 306).

The system processes the source image using the keypoint extraction machine learning model in accordance with current values of the keypoint model parameters to generate a plurality of source keypoint locations (step 308). As described above, each source keypoint location is a respective one of the plurality of locations.

The system processes the target image using the feature extraction neural network in accordance with the current values of the feature extraction network parameters to generate a target feature map that includes respective target feature vectors for each of the plurality of locations (step 310).

The system processes the target image using the keypoint extraction machine learning model in accordance with current values of the keypoint model parameters to generate a plurality of target keypoint locations (step 312).

The system generates, from the source feature map, a transported feature map by augmenting the source feature map with data from the target feature vectors for the target keypoint locations (step 314). As described above, in temporal transport the system generates the transported feature map by generating a source suppressed feature map by suppressing, i.e., lowering the weight assigned to, feature vectors in the source feature map that are for source keypoint or target keypoint locations. The system then augments this suppressed source feature map with data from the target feature vectors for the target keypoint locations to generate the transported feature map.

The system generates a reconstruction of the target image from the transported feature map (step 316).

The system determines an update to the current values of the keypoint model parameters by determining gradients with respect to the keypoint model parameters of an objective function that measures an error between the target image and the reconstruction of the target image (step 318). The system can then determine the update from the gradients by applying an update rule, e.g., a stochastic gradient descent learning rate, an Adam update rule, or an rmsProp update rule, to the gradients.

Figure 4:
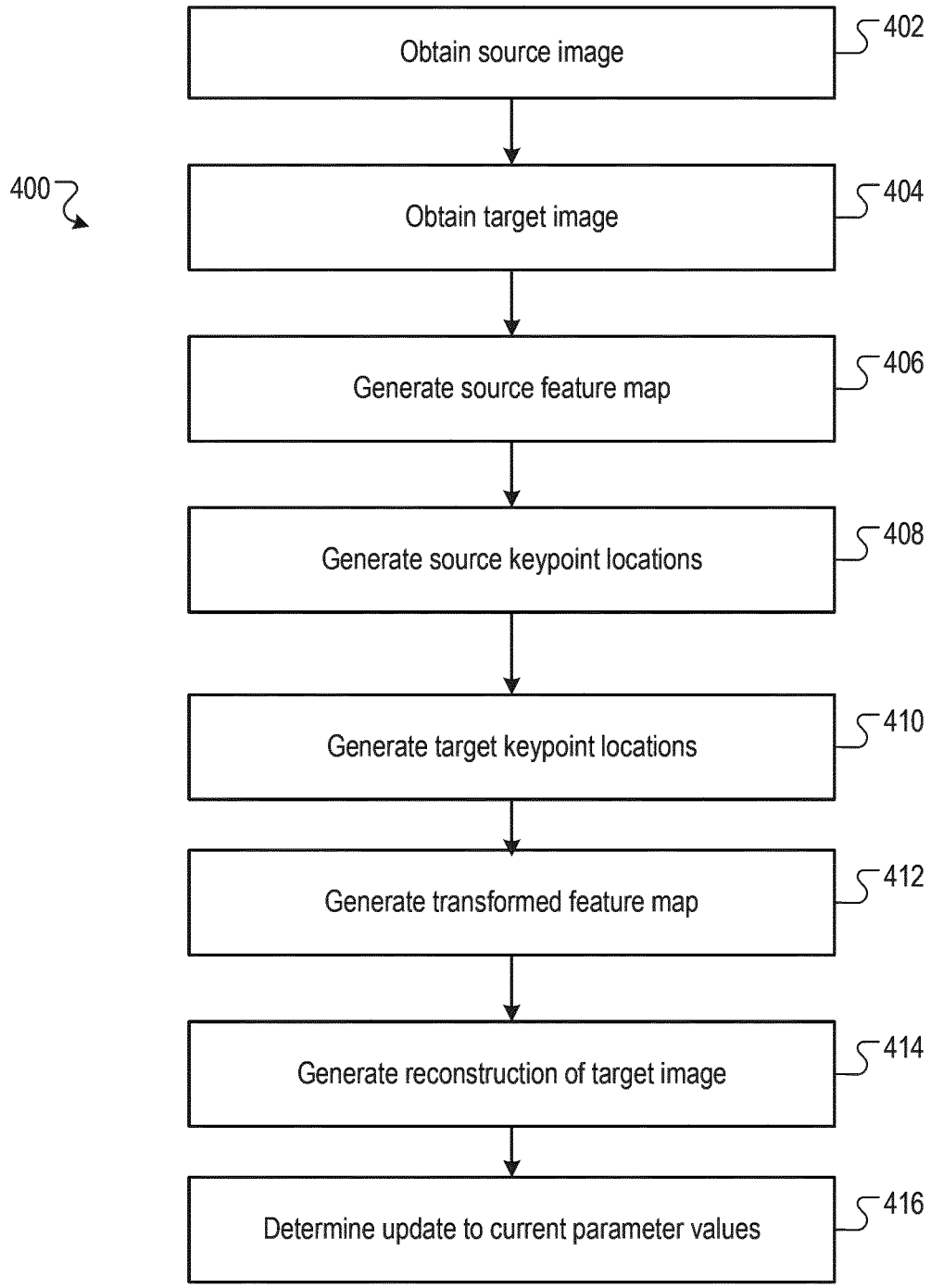
FIG. 4 is a flow diagram of another example process for training the keypoint extraction machine learning model using spatio-temporal transport.

FIG. 4 is a flow diagram of an example process 400 for training the keypoint extraction machine learning model using spatio-temporal transport. For convenience, the process 400 will be described as being performed by a system of one or more computers located in one or more locations. For example, a machine learning model training system, e.g., the machine learning model training system 100 of FIG. 1, appropriately programmed, can perform the process 400.

The system can perform the process 400 multiple times for multiple different source image-target image combinations to determine trained values of the keypoint extraction model parameters from initial values of the keypoint extraction model parameters, i.e., can perform the process 400 repeatedly at different training iterations of an iterative training process to train the keypoint extraction machine learning model.

For example, the system can perform the process 400 for each source image-target image combination in a mini-batch of training data to determine respective updates to the current values of the keypoint extraction model parameters and then use the updates computed for each of the pairs to update the current values, e.g., by combining, e.g., averaging or summing, the updates and then applying, i.e., adding or subtracting, the combined update to the current values of the keypoint extraction model parameters.

The system can repeat the updating for different mini-batches to train the model, i.e., repeat the updating for a specified number of iterations, for a specified amount of time, or until the change in the values of the parameters falls below a threshold.

The system obtains a source image of an environment (step 402) and a target image of the environment that was captured at a different time than the source image (step 404).

The system processes the source image using the feature extraction neural network in accordance with current values of the feature extraction network parameters to generate a source feature map that includes respective source feature vectors for each of a plurality of locations (step 406).

The system processes the source image using the keypoint extraction machine learning model in accordance with current values of the keypoint model parameters to generate a plurality of source keypoint locations (step 408). As described above, each source keypoint location is a respective one of the plurality of locations.

The system processes the target image using the keypoint extraction machine learning model in accordance with current values of the keypoint model parameters to generate a plurality of target keypoint locations (step 410).

The system generates, from the source feature map, a transported feature map by modifying the source feature map based on (dependent on) the target keypoint locations (step 412). As described above, in spatio-temporal transport the system may generate the transported feature map by generating a source suppressed feature map by suppressing, i.e., lowering the weight assigned to, feature vectors in the source feature map that are for source keypoint or target keypoint locations. The system may then augments the suppressed source feature map with data from other source feature vectors that have moved between the source and target images to generate the transported feature map.

The system generates a reconstruction of the target image from the transported feature map (step 414).

The system determines an update to the current values of the keypoint model parameters by determining gradients with respect to the keypoint model parameters of an objective function that measures an error between the target image and the reconstruction of the target image (step 416). The system can then determine the update from the gradients by applying an update rule, e.g., a stochastic gradient descent learning rate, an Adam update rule, or an rmsProp update rule, to the gradients.

In implementations in which the system trains the feature extraction neural network, the refinement neural network or both jointly with the keypoint extraction model, the system also determines an update to the current values of the feature extraction network parameters, the refinement network parameters, or both as part of performing the process 300 or the process 400.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method of training a keypoint extraction machine learning model having a plurality of keypoint model parameters, wherein the keypoint extraction machine learning model is configured to receive an input image and to process the input image in accordance with the keypoint model parameters to generate a plurality of keypoint locations in the input image, the method comprising:
   obtaining a source image of an environment;
   obtaining a target image of the environment that was captured at a different time than the source image;
   generating a reconstruction of the target image, the generating comprising:
      processing the source image using a feature extraction neural network having a plurality of feature extraction network parameters and in accordance with current values of the feature extraction network parameters to generate a source feature map that includes respective source feature vectors for each of a plurality of locations;
      processing the source image using the keypoint extraction machine learning model in accordance with current values of the keypoint model parameters to generate a plurality of source keypoint locations, wherein each source keypoint location is a respective one of the plurality of locations;
      processing the target image using the feature extraction neural network in accordance with the current values of the feature extraction network parameters to generate a target feature map that includes respective target feature vectors for each of the plurality of locations;
      processing the target image using the keypoint extraction machine learning model in accordance with current values of the keypoint model parameters to generate a plurality of target keypoint locations, wherein each target keypoint location is a respective one of the plurality of locations;
      generating, from the source feature map, a transported feature map by augmenting the source feature map with data from the target feature vectors for the target keypoint locations;
      generating the reconstruction of the target image from the transported feature map, comprising processing the transported feature map using a refinement neural network to generate the reconstruction; and
   determining an update to the current values of the keypoint model parameters by determining gradients with respect to the keypoint model parameters of an objective function that measures an error between the target image and the reconstruction of the target image.

2. The method of claim 1, wherein the refinement neural network is a convolutional neural network that maps the feature map to an image having the same resolution as the source and target images.

3. The method of claim 1, wherein obtaining the target image comprises:
   randomly sampling a time delta from a set of possible time deltas; and
   selecting, as the target image, the image that was captured at the sampled time delta from the source image.

4. The method of claim 1, wherein the objective function is an error between the reconstruction and the target image in a pixel space of the reconstruction and the target image.

5. The method of claim 1, further comprising:
   determining an update to the current values of the feature extraction network parameters by determining gradients with respect to the feature extraction network parameters of the objective function that measures the error between the target image and the reconstruction of the target image.

6. The method of claim 1, wherein the feature extraction neural network is a convolutional neural network that maps an image having the resolution of the source and target images to a feature map that includes respective vectors for each of the plurality of locations.

7. The method of claim 1, wherein generating, from the source feature map, a transported feature map comprises:
   generating a source suppressed feature map that suppresses source feature vectors that are at any of the source and target keypoint locations;
   generating a target suppressed feature map that suppresses target feature vectors that are at locations other than the target keypoint locations; and
   combining the source suppressed feature map and the target suppressed feature map to generate the transported feature map.

8. The method of claim 7 wherein generating the source suppressed feature map comprises:
   generating a source heatmap representation of the plurality of locations having Gaussian peaks at each of the source keypoint locations;
   generating a target heatmap representation of the plurality of locations having Gaussian peaks at each of the target keypoint locations; and
   generating, using the source and target heatmaps, the source suppressed feature map.

9. The method of claim 8, wherein the source suppressed feature map satisfies:

$$(1-\mathcal{H}_{\Psi(x_t)}) \cdot (1-\mathcal{H}_{\Psi(x_{t'})}) \cdot \Psi(x_t),$$

wherein $\Psi(x_t)$ is the source feature map, $\mathcal{H}_{\Psi(x_t)}$ is the source heatmap representation, and $\mathcal{H}_{\Psi(x_{t'})}$ is the target heatmap representation.

10. The method of claim 8, wherein generating the target suppressed feature map comprises multiplying the target heatmap representation by the target feature map.

11. A method of training a keypoint extraction machine learning model having a plurality of keypoint model parameters, wherein the keypoint extraction machine learning model is configured to receive an input image and to process the input image in accordance with the keypoint model parameters to generate a plurality of keypoint locations in the input image, the method comprising:
   obtaining a source image of an environment;
   obtaining a target image of the environment that was captured at a different time than he source image;
   generating a reconstruction of the target image, the generating comprising:
      processing the source image using a feature extraction neural network having a plurality of feature extraction network parameters and in accordance with current values of the feature extraction network parameters to generate a source feature map that includes respective source feature vectors for each of a plurality of locations;
      processing the source image using the keypoint extraction machine learning model in accordance with current values of the keypoint model parameters to generate a plurality of source keypoint locations, wherein each source keypoint location is a respective one of the plurality of locations;
      processing the target image using the keypoint extraction machine learning model in accordance with current values of the keypoint model parameters to generate a plurality of target keypoint locations, wherein each target keypoint location is a respective one of the plurality of locations;
      generating, from the source feature map, a transported feature map by modifying the source feature map based on the target keypoint locations;
      generating the reconstruction of the target image from the transported feature map, comprising processing the transported feature map using a refinement neural network to generate the reconstruction; and
   determining an update to the current values of the keypoint model parameters by determining gradients with respect to the keypoint model parameters of an objective function that measures an error between the target image and the reconstruction of the target image.

12. The method of claim 11, wherein the refinement neural network is a convolutional neural network that maps the feature map to an image having the same resolution as the source and target images.

13. The method of claim 11, wherein obtaining the target image comprises:
   randomly sampling a time delta from a set of possible time deltas; and
   selecting, as the target image, the image that was captured at the sampled time delta from the source image.

14. The method of claim 11, wherein the objective function is an error between the reconstruction and the target image in a pixel space of the reconstruction and the target image.

15. The method of claim 11, further comprising:
   determining an update to the current values of the feature extraction network parameters by determining gradients with respect to the feature extraction network parameters of the objective function that measures the error between the target image and the reconstruction of the target image.

16. The method of claim 11, wherein the feature extraction neural network is a convolutional neural network that maps an image having the resolution of the source and target images to a feature map that includes respective vectors for each of the plurality of locations.

17. The method of claim 11, wherein generating, from the source feature map, a transported feature map comprises:
   generating a source suppressed feature map that suppresses source feature vectors that are at any of the source and target keypoint locations;
   generating a source shifted feature map that shifts data from source feature vectors that are at source keypoint locations to source feature vectors that are at target keypoint locations; and
   combining the source suppressed feature map and the source shifted feature map to generate the transported feature map.

18. The method of claim 17 wherein generating the source suppressed feature map comprises:
   generating a source heatmap representation of the plurality of locations having Gaussian peaks at each of the source keypoint locations;
   generating a target heatmap representation of the plurality of locations having Gaussian peaks at each of the target keypoint locations; and
   generating, using the source and target heatmaps, the source suppressed feature map.

19. The method of claim 18, wherein the source suppressed feature map satisfies:

$$(1-\mathcal{H}_{\Psi(x_t)}) \cdot (1-\mathcal{H}_{\Psi(x_{t'})}) \cdot \Psi(x_t),$$

wherein $\Psi(x_t)$ is the source feature map, $\mathcal{H}_{\Psi(x_t)}$ is the source heatmap representation, and $\mathcal{H}_{\Psi(x_{t'})}$ is the target heatmap representation.

20. The method of claim 18, wherein the source shifted feature map satisfies:

$$\sum_{i=1}^{K} \mathcal{H}^i_{\Psi(x_{i'})} \odot \left( \sum_{h,w} \mathcal{H}^i_{\Psi(x_i)} \cdot \Phi(x_i) \right)$$

where K is the total number of target keypoint locations, and $\odot$ is a Haddamard product.

21. A system comprising one or more computers and one or more storage devices storing instructions that when executed by one or more computers cause the one or more computers to perform operations for training a keypoint extraction machine learning model having a plurality of keypoint model parameters, wherein the keypoint extraction machine learning model is configured to receive an input image and to process the input image in accordance with the keypoint model parameters to generate a plurality of keypoint locations in the input image, the operations comprising:

obtaining a source image of an environment;

obtaining a target image of the environment that was captured at a different time than the source image;

generating a reconstruction of the target image, the generating comprising:

processing the source image using a feature extraction neural network having a plurality of feature extraction network parameters and in accordance with current values of the feature extraction network parameters to generate a source feature map that includes respective source feature vectors for each of a plurality of locations;

processing the source image using the keypoint extraction machine learning model in accordance with current values of the keypoint model parameters to generate a plurality of source keypoint locations, wherein each source keypoint location is a respective one of the plurality of locations;

processing the target image using the feature extraction neural network in accordance with the current values of the feature extraction network parameters to generate a target feature map that includes respective target feature vectors for each of the plurality of locations;

processing the target image using the keypoint extraction machine learning model in accordance with current values of the keypoint model parameters to generate a plurality of target keypoint locations, wherein each target keypoint location is a respective one of the plurality of locations;

generating, from the source feature map, a transported feature map by augmenting the source feature map with data from the target feature vectors for the target keypoint locations;

generating the reconstruction of the target image from the transported feature map, comprising processing the transported feature map using a refinement neural network to generate the reconstruction; and determining an update to the current values of the keypoint model parameters by determining gradients with respect to the keypoint model parameters of an objective function that measures an error between the target image and the reconstruction of the target image.

22. The system of claim 21, wherein generating, from the source feature map, a transported feature map comprises:

generating a source suppressed feature map that suppresses source feature vectors that are at any of the source and target keypoint locations;

generating a target suppressed feature map that suppresses target feature vectors that are at locations other than the target keypoint locations; and combining the source suppressed feature map and the target suppressed feature map to generate the transported feature map.

23. The system of claim 22 wherein generating the source suppressed feature map comprises:

generating a source heatmap representation of the plurality of locations having Gaussian peaks at each of the source keypoint locations;

generating a target heatmap representation of the plurality of locations having Gaussian peaks at each of the target keypoint locations; and generating, using the source and target heatmaps, the source suppressed feature map.

24. A system comprising one or more computers and one or more storage devices storing instructions that when executed by one or more computers cause the one or more computers to perform operations for training a keypoint extraction machine learning model having a plurality of keypoint model parameters, wherein the keypoint extraction machine learning model is configured to receive an input image and to process the input image in accordance with the keypoint model parameters to generate a plurality of keypoint locations in the input image, the operations comprising:

obtaining a source image of an environment;

obtaining a target image of the environment that was captured at a different time than he source image;

generating a reconstruction of the target image, the generating comprising:

processing the source image using a feature extraction neural network having a plurality of feature extraction network parameters and in accordance with current values of the feature extraction network parameters to generate a source feature map that includes respective source feature vectors for each of a plurality of locations;

processing the source image using the keypoint extraction machine learning model in accordance with current values of the keypoint model parameters to generate a plurality of source keypoint locations, wherein each source keypoint location is a respective one of the plurality of locations;

processing the target image using the keypoint extraction machine learning model in accordance with current values of the keypoint model parameters to generate a plurality of target keypoint locations, wherein each target keypoint location is a respective one of the plurality of locations;

generating, from the source feature map, a transported feature map by modifying the source feature map based on the target keypoint locations;

generating the reconstruction of the target image from the transported feature map, comprising processing the transported feature map using a refinement neural network to generate the reconstruction; and determining an update to the current values of the keypoint model parameters by determining gradients with respect to the keypoint model parameters of an objective function that measures an error between the target image and the reconstruction of the target image.

* * * * *